United States Patent Office 2,743,162
Patented Apr. 24, 1956

2,743,162

PREPARATION OF ALKALI METAL DOUBLE FLUORIDES OF ZIRCONIUM AND HAFNIUM

Eugene Wainer, Cleveland Heights, Ohio, assignor, by mesne assignments, to the United States of America as represented by the United States Atomic Energy Commission No Drawing. Application January 31, 1952, Serial No. 269,144

9 Claims. (Cl. 23—88)

The double fluorides of zirconium or hafnium and a base such as ammonium, potassium, and sodium, are of importance for commercial applications. These raw materials are used as flux ingredients in non-ferrous and ferrous metallurgy. In view of the wide scale use of these compounds, cost is a major item in determining their effectiveness. Known methods of preparing the compounds involve the formation of a fluorine derivative of zirconium in solution, usually through attack of a raw material with hydrofluoric acid and then precipitating the desired compound through the addition of the proper alkali metal fluoride. All of the reagents used in such a procedure are quite expensive and the end result is that the product is costly.

In contrast, the present invention is concerned with the preparation of alkali metal double fluorides of zirconium or hafnium in a manner avoiding high costs, and resulting in products in a range applicable for uses heretofore excluded. The preparation of alkali metal double fluorides of titanium by a related process is described in my copending application Serial No. 269,143, filed concurrently herewith.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In the usual technology of zirconium, one stage in the purification of the element from its ores usually involves the preparation of a sulfate derivative which is characterized by its insolubility in water. In any case, the preparation of a basic water insoluble sulfate represents an excellent means for making certain that the compounds in question have been separated from deleterious impurities such as iron and aluminum.

In the case of zirconium, the formation of basic sulfates of water insoluble character is commonly used as a means for purifying a zirconium raw material. A characteristic of the basic sulfates of zirconium is the high degree of insolubility in water or in acid media. The basic sulfates may be transformed to the normal sulfate through the addition of the requisite amount of sulfuric acid or to an alkali metal double sulfate by the addition of a mixture of sulfuric acid and alkali metal sulfate. In any case, these represent logical starting agents for the preparation of other compounds.

The normal sulfate of zirconium contains two moles of sulfuric acid to one mole of zirconia, this being the requirement for complete water solubility. Generally any ratio less than this amount leads to water insolubility. The compound normally obtained by the usual methods of hydrolytic separation of zirconium is the one in which the ratio of the zirconia to sulfate ion is of the value varying between 3 to 2 and 5 to 2 and the average ratio most commonly encountered is the ratio 5 to 3. When properly prepared, this precipitate is insoluble, highly crystalline and is readily filtered and may be washed in a slightly acid solution without loss of zirconium value.

Using such sulfate derivatives of zirconium of the general nature as described in the foregoing, my novel method of preparation of the complex fluoride involves the treatment of one or the other of its various sulfates with a fluorinating agent in the presence of a soluble alkali metal salt which provides the requisite alkali metal. Thus, a sulfate of zirconium is reacted with material containing fluorine, and an alkaline earth metal such as calcium, barium or strontium and a base selected from the class consisting of alkali metals and NH$_4$. Of the latter class, potassium and sodium are the metals of practical importance. However, the term "alkali metal compound" shall be used herein and in the claims as a generic expression to include both the alkali metal salts and the ammonium salts. The reactions depend on the insolubilization of the sulfate ion either through the medium of the formation of calcium sulfate or barium sulfate, these being the most available as compared to the strontium compound. For reasons of economy, the calcium derivative is preferred. These reactions may take place under different conditions. Of these, the two most important are (1) digestion at temperatures in the region of the boiling point of water and (2) a low temperature heat treatment in the region of 500° to 600° C. followed by leaching with water. Both procedures are effective and the use of one or the other is determined by the nature of the end requirements. Thus in one series of reactions, a basic zirconium sulfate is dispersed in water and digested with a mixture of potassium sulfate, sulfuric acid, and fluorspar. The end products of the reaction are potassium zirconium fluoride and calcium sulfate. In a modification of this reaction, basic zirconium sulfate, sulfuric acid, fluorspar, and potassium sulfate are thoroughly mixed in paste form, the paste dried, and then the mixture is calcined at a temperature between 500° and 600° C. for about an hour; and in still a further modification of this reaction, the materials are thoroughly mixed in dry form and then calcined at temperatures of 500° to 600° C.

Other fluorinating agents may be used in place of the fluorspar and of these, the most important are the fluosilicates of sodium, potassium or ammonium, and again in this case, the reaction may be carried to completion by digestion at temperatures close to 100° C. or through reaction at elevated temperatures in the region of 500° to 600° C. When the fluosilicates are used as fluorinating agents, a specific series of steps are required to obtain the desired results involving chiefly a contact between the fluorinating agent and the zirconium sulfate first, followed by treatment with a sulfate insolubilizing agent such as alkaline earth compounds, e. g. calcium, barium, or strontium compounds in order to obtain the desired results. If desired, combinations of fluosilicates and fluorides may be used for the purpose.

From a material standpoint, suitable sulfates of zirconium for the purposes of these reactions are the basic sulfate, the normal sulfate, and an alkali metal double sulfate of sodium or potassium. The major differences imposed by virtue of the differences in the nature of the starting agents is the replenishment of the alkali or sulfate ion which might be required in order to provide sufficient material for completion of the reactions to be given hereinafter.

With respect to the alkali metal, this may be supplied as water soluble salts of ammonium, sodium, or potassium depending on which complex fluoride is desired. If the ammonium salt is used, only those reactions which take place through the medium of digestion below 100° C. are effective since calcination decomposes the ammonium zirconium fluoride then formed. In the case of the alkali metal salts, it appears that most of the water soluble salts are useful. Specifically, such salts as the carbonate, the sulfate, the chloride, or the fluoride may be used if desired, and again, the variation from one anion to the other simply modifies the stoichiometric requirements that are imposed on the sum total of the reactants. While sulfuric acid is the preferred acid used throughout, phosphoric may also be used, but in view of its cost it is not normally recommended. Fluorides effective for the purposes of this invention are those of calcium, barium, and the complex fluosilicates, such as potassium fluosilicate, sodium fluosilicate, or ammonium fluosilicate. In these cases also the reaction may be accomplished either through the medium of digestion in solution or through a dry reaction carried out at a temperature range of 500° to 600° C. It has been stated that a variety of water soluble alkali metal salts can be used for purposes of these reactions, but of the various water soluble derivatives, the sulfate, carbonate, or fluoride are preferred. While the reaction will proceed in the presence of the chloride, the elimination of the water soluble chloride from the end product requires an extra step in the preparation.

The chemistry involved in the various reactions which have been generally stated above may be listed below.

1.
$$3ZrO_2.2H_2SO_4 + 3K_2SO_4 + 4H_2SO_4 + 9CaF_2 + 11H_2O \xrightarrow[\text{digest}]{\text{water solution}}$$
$$3K_2ZrF_6 + 9CaSO_4.2H_2O$$

2.
$$Zr(SO_4)_2 + K_2SO_4 + 3CaF_2 + 6H_2O \xrightarrow[\text{digest}]{\text{water solution}}$$
$$K_2ZrF_6 + 3CaSO_4.2H_2O$$

3.
$$Zr(SO_4)_2 + K_2SO_4 + 3CaF_2 \xrightarrow[600°\text{ C.}]{\text{calcine}} K_2ZrF_6 + 3CaSO_4$$

4.
$$Zr(SO_4)_2 + K_2SiF_6 \text{ digest in water solution add 2 } CaCO_3 \text{ digest} \longrightarrow$$
$$K_2ZrF_6 + SiO_2 + 2CaSO_4 + 2CO_2$$

5.
$$ZrO.SO_3 + K_2SiF_6 + CaCO_3 \xrightarrow[600-700°]{\text{calcine}}$$
$$K_2ZrF_6 + CaSO_4 + SiO_2 + CO_2$$

The reactions contemplated are clearly indicated in the equations. In order to obtain the best rate of reaction, all of the ingredients which are not water soluble should be provided in as finely divided a form as possible. The digestion reactions are carried out with stirring in order to keep the reactants in intimate contact at all times. In the case of the basic sulfate, an ideal form in which the material can be added to the reaction is in the medium of a freshly dispersed filter cake. The calcium fluoride and fluosilicate normally used in the various reactions should be provided in fineness of at least $-325$ mesh (Tyler standard).

Though the schematic equations indicate the nature of the reactions taking place, it is generally advisable to carry out the reaction in the presence of a slight excess of fluoride ion. This is made available in reaction 1 for example through the addition of equimolecular excesses of sulfuric acid and fluorspar. In the case of reactions 2 and 3, the same precaution is effective, that is through the addition of slight extra amounts of fluorspar and an equimolecular amount of sulfuric acid to take into consideration this addition of fluorspar. In the case of reaction 4, this excess of fluoride ion may be provided through the medium of a small amount of potassium fluoride added to the original reaction.

Describing now the digestion reactions, a basic zirconium sulfate precipitate which has been prepared in the usual manner is dispersed in water so as to provide an easily stirrable solution. The amount of sulfuric acid indicated by Equation 1 for example is then added, followed by a water solution of the potassium sulfate. After stirring and mixture is complete, the finely divided fluorspar is then added and the solution stirred for several minutes, after which the temperature is raised to between 90° and 100° C. and digestion continued for one to three hours. The mixture will then consist of a coarsely crystalline precipitate of hemi-hydrated calcium sulfate which in the usual course of events will contain some fluoride bound in the structure. The effect of this slight amount of fluoride is to make the calcium sulfate more insoluble in the menstrum. The solution will contain the complex double fluoride of zirconium. The solution is separated from the coarse precipitate by settling, decantation and filtration. If washing is used on the crystals, the wash water should contain a slight amount of potassium fluoride and the washing should be maintained slightly acid at all times with sulfuric acid. The liquors are concentrated and allowed to cool, after which the alkali metal double fluoride of zirconium precipitates out and the amount of water used for crystallization is determined by the nature of the compound present.

When the normal sulfates of zirconium are used, fairly concentrated solutions of these materials are first prepared so that the liquor contains 30 to 40% of such agents. The powdered fluorspar is then added to the solution and the whole stirred for several minutes until the mixture is complete, after which the potassium sulfate in the form of a concentrated solution is mixed in. The solution is stirred vigorously and then the temperature is raised to 90° to 100° C. and after digestion for a period one to three hours, the separation as indicated before, i. e., settling, decantation, filtration, washing, and crystallization is completed to obtain the desired end product. In the reactions which are completed through the medium of a low temperature calcination, and extremely thick slurry of all the agents is usually prepared. All the raw materials are very finely ground before being mixed to form the thick slurry and after mixing for a few minutes, a pronounced thickening takes place. The wet slurry can then be thrown directly into the floor of a calcination furnace being maintained at a temperature of 500° to 600° C. and the calcination is continued at this temperature for a period of at least an hour, rabbling the mass continuously to make certain that the heat is imparted to all portions of it. After removal from the furnace, the mixture is then digested in hot water containing a slight amount of sulfuric acid of the order of one to two per cent and enough water is used so that the slurry is easily stirrable. The end products of this reaction are identical with those of the foregoing. The advantage of the calcination step is that it eliminates some of the operations involved in the wet method of approach.

When an alkali metal fluosilicate is used as a fluorinating agent, the reaction should take place in steps in order to obtain the desired end product. In this case, the zirconium sulfate is first dispersed or dissolved in water as determined by the nature of the starting raw material and the alkali metal fluosilicate compound in very finely divided form is then stirred in. Stirring is continued with digestion for about an hour after which an amount of alkaline earth carbonate such as calcium carbonate or barium carbonate is added to the mixture sufficient to precipitate all the sulfate ion. The mixture then is again digested at an elevated temperature and the end products of the reaction are the complex fluozirconate in solution and a precipitate consisting of silica and calcium sulfate. These are separated from the desired compound by the usual methods of filtration and the like. Again it should be emphasized that this reaction is also carried out in the presence of a slight excess of potassium fluoride. Again this reaction may be completed through the medium of calcination, and as a matter of fact, calcination is to a certain extent preferred. For the calcination purposes, all of the reagents are mixed in a thoroughly dry and finely powdered condition and for this reason, it is usually more effective to use the basic sulfate derivatives of the zirconium since these may be more readily dried than the normal sulfates. Under these conditions, a complete mixture is possible without too much difficulty. On calcination, a sinter is obtained in the region of 600° to 700° C. After leaching, the complex zirconium fluoride is obtained in the filtrate, and the silica and calcium sulfate are separated out as precipitates. Again as before, a slight excess of fluoride ion is provided in the reactants to make certain that a hydrated compound of zirconium will not be prepared. In the case of the reactions involving the complex fluosilicates as fluorinating agents, the calcination reaction is the preferred one since when the reaction is completed through normal digestion techniques, the gelatinous silica formed makes it somewhat difficult to separate the precipitate from the desired reagents with the requisite ease.

In carrying out these various reactions, it is always a requirement that the reaction remain slightly on the acid side, and in the presence of a slight excess of fluoride ion. In this way, the formation of basic fluorides or of hydrates of zirconium is prevented.

If carried out in accordance with this system, the yields are normally in excess of 90%. This yield is best determined by evaporating the solution containing the salts completely to dryness since the major portion of the loss in yield is developed through the recrystallization requirement.

The reactions involved here, and the same procedures are likewise applicable to hafnium, accordingly, the features as herein described are also to be considered as concerning hafnium.

Having described my invention in general terms, the following examples are illustrative of recommended practice:

*Example 1.*—132 grams of basic zirconium sulfate, equivalent to 62 grams of zirconium dioxide are dispersed in 200 cc. of water and stirred. 90% sulfuric acid is then added to digest the zirconium sulfate and stirring continued. In a separate container, 54 grams of potassium sulfate, and 2 grams of KF are dissolved in 400 cc. of hot water and this solution is then added slowly with stirring to the acid zirconium sulfate solution 62 grams of —325 mesh fluorspar is then slurried in 100 cc. of water and this slurry added to the potassium zirconium acid sulfate solution. The stirring is continued for about 15 minutes and the solution is then heated until a temperature of approximately 90° C. is obtained. With occasional stirring, the heating is continued for 2 hours, after which the level of the solution is diluted to an approximate volume of 2 liters, and the digestion is continued for several minutes more. A coarse precipitate is formed in the solution and while still maintained in the hot condition, the liquid is allowed to settle quietly without stirring until the supernatant liquid is clear. The clear liquid is then decanted into a flat pan, and the crystalline residue washed once with hot water containing about 1% sulfuric acid and about 0.5% potassium fluoride. After settling and decantation, the clear liquid is added to the original filtrate. The crystals are then thrown on an acid proof filter and dewatered as completely as possible, after which the crystals are washed once with 100 cc. of hot water of composition similar to the first wash water. All of the filtrates are combined and evaporated to a volume such that evident crystallization is taking place. This usually is observed at a volume of less than 500 cc. The solution is then cooled to about 10° C., during which a crop of white coarse crystals develops. These crystals are dewatered in a centrifuge and then dried. The liquor from the first centrifuging is retained to be used as the mother liquor in a subsequent crystallization. If the drying is accomplished at a temperature less than 80° C., about 80 grams of crystallized product of the formula $K_2ZrF_6$ is the yield. Evaporation of the liquid recovered from the centrifuge to dryness will provide a further amount of product. In general for potassium zirconium fluoride, the solutions may be evaporated to about 200 cc. before cooling is commenced. If the drying is carried out above 100° C., the potassium zirconium fluoride will lose a molecule of water, in which case the weight yields will be approximately 7% less, due to this water loss.

*Example 2.*—36 grams of normal zirconium sulfate of formula $Zr(SO_4)_2.4H_2O$ is dissolved in 100 cc. of hot water. 25 grams of —325 mesh fluorspar is added slowly with stirring and the solution is digested for a few minutes. Then 18 grams of potassium sulfate dissolved in 150 cc. of hot water is added and the digestion is continued for a few minutes more, after which 1 liter of hot water is added and the temperature of the liquid is then increased to about 90° C. The digestion is continued for about 2 hours, at which point the solution is diluted to 1500 cc. while still maintaining the temperature at 90° to 95° C. The stirring is stopped and the solution is allowed to clarify by settling and decantation. The precipitated calcium sulfate is removed, and approximately 25 grams of product is obtained from the first batch of crystals on drying at 85° C. Evaporation of the first wash water from the crystals yields another few grams. The formula of the product is $K_2ZrF_6$.

*Example 3.*—360 grams of normal zirconium sulfate having the formula $Zr(SO_4)_2.4H_2O$ is thoroughly dried and finely powdered. A mixture is then prepared of 180 grams of finely powdered potassium sulfate, 240 grams of —325 mesh fluorspar, and the zirconium sulfate referred to above. In order to insure complete mixing, sufficient water is added to make the mix almost wet enough to be stirred, and on grinding together in an intensive mixer the mix stiffens to a hard cementitious type mass. This mass is broken out of the mixer and thrown into a furnace heated to about 600° C. The material is calcined at this temperature for about an hour and a half, and the hard sinter is then discharged. The sinter is ground to a powder and dispersed in 4 liters of hot water and then digestion in hot water is continued for about an hour. The end products of the reaction are potassium zirconium fluoride in solution and calcium sulfate as a precipitate, and these are separated in the manner of Example 1. The yield of potassium zirconium fluoride is about 270 grams.

*Example 4.*—355 grams of normal zirconium sulfate is dissolved in a liter of hot water. 225 grams of potassium fluosilicate and 10 grams of potassium fluoride in finely powdered form are added to the water solution and the whole is digested at about 90° C. for about 1 hour. A slurry is prepared in a separate container of 200 grams of precipitated calcium carbonate in 500 cc. of water and this slurry is slowly added to the stirred original solution of the fluosilicate and fluoride and zirconium sulfate. The solution is then digested at 90° to 95° C. for another hour to an hour and a half, and is then diluted with hot water to a total volume of about 10 liters. After digesting in this diluted condition for 30 to 50 minutes, the stirring is stopped and while maintaining the solution hot the precipitate is allowed to settle. The liquid containing the precipitate is freed of precipitate by settling, decantation, filtration, and washing. Concentration of the clarified wash liquors is accomplished by evaporation to a volume of approximately 1 liter and the relatively thick liquid is then allowed to cool to room temperature. A well crystallized crop of crystals in yield of about 275 grams is obtained after centrifuging and drying at 75° to 0° C.

*Example 5.*—265 grams of basic zirconium sulfate, equivalent to 123 grams of zirconium oxide, is mixed with the reagents described in Example 1, and the same procedure is followed except that the solution is evaporated to approximately 500 cc. before crystallization is allowed to commence. A yield of about 275 grams of potassium zirconium fluoride is obtained.

Other modes of applying the principle of the invention may be employed, change being made as regards the details described, provided the features stated in any of the following claims or the equivalent of such be employed.

I therefore particularly point out and distinctly claim as my invention:

1. The method of producing a double fluoride of an alkali metal and a metal of the group consisting of zirconium and hafnium from an iron-free sulfate of said metal which comprises directly and concurrently reacting said sulfate with a source of combined alkali metal and combined alkaline earth metal and combined fluorine provided by at least one alkaline earth compound other than the fluozirconates and fluohafnates and at least one alkli metal compound other than the fluozirconates and fluohafnates separating the resulting alkaline earth sulfate; and recovering the resulting double fluoride of said metal and said alkali metal.

2. The method of claim 1 in which one of the reactants is an alkaline earth fluoride.

3. The method of claim 1 in which one of the reactants is an alkali metal fluosilicate.

4. The method of producing a double fluoride of an alkali metal and a metal of the group consisting of zirconium and hafnium from an iron-free sulfate of said metal which comprises: digesting said sulfate in an aqueous medium at about the boiling point with a source of combined alkali metal and combined alkaline earth metal and combined fluorine provided by at least one alkaline earth metal compound other than the fluozirconates and fluohafnates and at least one water soluble alkali metal compound other than the fluozirconates and fluohafnates; separating the resulting aqueous medium from the insolubles; and recovering the dissolved double fluoride of said metal and said alkali metal from the separated aqueous medium.

5. The method of producing a double fluoride of an alkali metal and a metal of the group consisting of zirconium and hafnium from an iron free sulfate of said metal which comprises: digesting said sulfate in an aqueous medium at about the boiling point with at least one alkaline earth metal fluoride and at least one water soluble alkali metal compound other than the fluozirconates and fluohafnates, separating the resulting aqueous medium from the insolubles; and recovering the dissolved double fluoride of said metal and said alkali metal from the separated aqueous medium.

6. The method of producing a double fluoride of an alkali metal and a metal of the group consisting of zirconium and hafnium from an iron-free sulfate of said metal which comprises: digesting said sulfate in an aqueous medium at about the boiling point with at least one alkali metal fluosilicate and at least one alkaline earth compound other than the fluozirconates and fluohafnates, separating the resulting aqueous medium from the insolubles; and recovering the dissolved double fluoride of said metal and said alkali metal from the separated aqueous medium.

7. The method of producing a double fluoride of an alkali metal and a metal of the group consisting of zirconium and hafnium from an iron-free sulfate of said metal which comprises: calcining said sulfate at a temperature of about 600° C. with a source of combined alkali metal and combined alkaline earth metal and combined fluorine provided by at least one alkaline earth compound other than the fluozirconates and fluohafnates and at least one alkali metal compound other than the fluozirconates and fluohafnates and which is not appreciably volatile at about 600° C.; leaching the calcined mass with an aqueous medium; separating the resulting leach liquor from the insolubles; and recovering said double fluoride of said metal and said alkali metal from the separated leach liquor.

8. The method of producing a double fluoride of an alkali metal and a metal of the group consisting of zirconium and hafnium from an iron-free sulfate of said metal which comprises: calcining said sulfate at a temperature of about 600° C. with at least one alkaline earth fluoride and at least one alkali metal compound other than the fluozirconates and fluohafnates and which is not appreciably volatile at about 600° C.; leaching the calcined mass with an aqueous medium; separating the resulting leach liquor from the insolubles; and recovering said double fluoride of said metal and said alkali metal from the separated leach liquor.

9. The method of producing a double fluoride of an alkali metal and a metal of the group consisting of zirconium and hafnium from an iron-free sulfate of said metal which comprises: calcining said sulfate at a temperature of about 600° C. with at least one alkaline earth compound other than the fluozirconates and fluohafnates and at least one alkali metal fluosilicate which is not appreciably volatile at about 600° C.; leaching the calcined mass with an aqueous medium; separating the resulting leach liquor from the insolubles; and recovering said double fluoride of said metal and said alkali metal from the separated leach liquor.

References Cited in the file of this patent

UNITED STATES PATENTS

| 2,475,287 | Kawecki | July 5, 1949 |
| 2,568,341 | Kawecki | Sept. 18, 1951 |

FOREIGN PATENTS

| 220,358 | Great Britain | Aug. 11, 1924 |